(12) United States Patent
Turner et al.

(10) Patent No.: US 11,578,144 B2
(45) Date of Patent: Feb. 14, 2023

(54) COMPOSITIONS AND METHODS FOR REMOVING CONTAMINANTS FROM PLASTICS PROCESSING EQUIPMENT

(71) Applicant: 2569924 Ontario Inc., Aurora (CA)

(72) Inventors: Joseph Albert Turner, Kitchener (CA); Bryon Wolff, Aurora (CA)

(73) Assignee: 2569924 Ontario Inc., Aurora (CA)

( * ) Notice: Subject to any disclaimer, the term of this patent is extended or adjusted under 35 U.S.C. 154(b) by 805 days.

(21) Appl. No.: 16/420,832

(22) Filed: May 23, 2019

(65) Prior Publication Data

US 2019/0375861 A1 Dec. 12, 2019

Related U.S. Application Data

(60) Provisional application No. 62/675,438, filed on May 23, 2018.

(51) Int. Cl.

| | |
|---|---|
| *C08F 2/00* | (2006.01) |
| *C08L 23/08* | (2006.01) |
| *C08K 3/34* | (2006.01) |
| *C08K 3/26* | (2006.01) |
| *C08K 3/30* | (2006.01) |
| *C08K 3/38* | (2006.01) |
| *C08L 23/16* | (2006.01) |
| *C08K 3/22* | (2006.01) |

(52) U.S. Cl.
CPC ............. *C08F 2/008* (2013.01); *C08K 3/22* (2013.01); *C08K 3/26* (2013.01); *C08K 3/30* (2013.01); *C08K 3/34* (2013.01); *C08K 3/38* (2013.01); *C08L 23/08* (2013.01); *C08L 23/16* (2013.01); *C08K 2003/2241* (2013.01); *C08K 2003/265* (2013.01); *C08K 2003/3045* (2013.01); *C08K 2003/387* (2013.01); *C08L 2205/02* (2013.01); *C08L 2205/16* (2013.01); *C08L 2207/062* (2013.01)

(58) Field of Classification Search
USPC .......................... 528/484; 264/39; 510/188
See application file for complete search history.

(56) References Cited

U.S. PATENT DOCUMENTS

| | | |
|---|---|---|
| 2,744,841 A | 5/1956 | Cassis et al. |
| 3,071,498 A | 1/1963 | Kaskel |
| 3,119,720 A | 1/1964 | Stiles et al. |

(Continued)

FOREIGN PATENT DOCUMENTS

| | | |
|---|---|---|
| EP | 0800910 A1 | 10/1997 |
| EP | 0800910 B1 | 8/2001 |

(Continued)

OTHER PUBLICATIONS

JP 07-009531 A, Machine-generated translation of Detailed Description. (Year: 1995).*
JP 07-009531 A, Derwent Abstract. (Year: 1995).*

*Primary Examiner* — Fred M Teskin
(74) *Attorney, Agent, or Firm* — Bereskin & Parr LLP

(57) ABSTRACT

Compositions for removing contaminants from plastics processing equipment are described herein. The compositions may include a polymeric carrier component, an oxidizing agent, an abrasive and/or a gas agent. Methods of preparing the compositions described herein and methods of removing contaminants from plastics processing equipment are also described.

20 Claims, 1 Drawing Sheet

(56) References Cited

U.S. PATENT DOCUMENTS

| | | |
|---|---|---|
| 3,776,774 A | 12/1973 | Miller |
| 3,869,525 A | 3/1975 | Miller |
| 4,731,126 A | 3/1988 | Dixit et al. |
| 4,823,819 A | 4/1989 | Schmidt |
| 4,838,945 A | 6/1989 | Fujii et al. |
| 4,838,948 A | 6/1989 | Bailey |
| 4,919,161 A | 4/1990 | Schmidt |
| 4,954,545 A | 9/1990 | Bailey |
| 4,976,788 A | 12/1990 | Nohr et al. |
| 5,087,653 A | 2/1992 | Obama et al. |
| 5,139,694 A | 8/1992 | Kmiec |
| 5,233,037 A | 8/1993 | Nielinger et al. |
| 5,236,514 A | 8/1993 | Leung et al. |
| 5,238,608 A | 8/1993 | Obama et al. |
| 5,266,694 A | 11/1993 | Moran, Jr. |
| 5,298,078 A | 3/1994 | Itoh et al. |
| 5,302,756 A | 4/1994 | McKinney |
| 5,395,456 A | 3/1995 | Abrams et al. |
| 5,395,974 A | 3/1995 | McKinney |
| 5,397,498 A | 3/1995 | Ishida et al. |
| 5,424,012 A | 6/1995 | Ertle et al. |
| 5,443,768 A | 8/1995 | Scheibelhoffer et al. |
| 5,668,277 A | 9/1997 | Hendrix et al. |
| 5,932,724 A | 8/1999 | Sifniades et al. |
| 5,958,313 A | 9/1999 | Yamamoto et al. |
| 5,965,624 A | 10/1999 | Armstrong et al. |
| 6,022,420 A | 2/2000 | Eberle et al. |
| 6,060,439 A | 5/2000 | Doyel et al. |
| 6,060,445 A | 5/2000 | Chandraker et al. |
| 6,087,494 A | 7/2000 | Thomissen |
| 6,235,821 B1 | 5/2001 | Saito |
| 6,288,144 B1 | 9/2001 | Roberts et al. |
| 6,294,120 B1 | 9/2001 | Negi et al. |
| 6,384,002 B1 | 5/2002 | Nitzsche |
| 6,514,922 B2 | 2/2003 | Waldrop |
| 6,530,382 B2 | 3/2003 | Waldrop |
| 6,551,411 B1 | 4/2003 | Ito et al. |
| 6,617,295 B2 | 9/2003 | Nitzsche |
| 6,673,759 B1 | 1/2004 | Koch et al. |
| 6,916,770 B2 | 7/2005 | Nitzsche |
| 6,946,026 B2 | 9/2005 | Sato et al. |
| 7,025,070 B2 | 4/2006 | Sato |
| 7,067,571 B2 | 6/2006 | Sato |
| 7,132,503 B2 | 11/2006 | Pawlow et al. |
| 8,080,506 B2 | 12/2011 | Shida et al. |
| 8,492,473 B2 | 7/2013 | Roy et al. |
| 2002/0187912 A1 | 12/2002 | Waldrop |
| 2002/0198121 A1 | 12/2002 | Nitzsche |
| 2003/0221707 A1 | 12/2003 | Blanton et al. |
| 2004/0083925 A1 | 5/2004 | Sato |
| 2004/0132878 A1 | 7/2004 | Sato |
| 2004/0132879 A1 | 7/2004 | Sato |
| 2004/0175454 A1 | 9/2004 | Thomson |
| 2007/0135611 A1 | 6/2007 | Brack et al. |
| 2007/0238636 A1 | 10/2007 | Thomson |
| 2010/0175720 A1 | 7/2010 | Ito et al. |
| 2011/0012275 A1 | 1/2011 | Shida et al. |
| 2011/0146798 A1 | 6/2011 | Hutton |
| 2012/0245269 A1 | 9/2012 | Roy et al. |
| 2014/0097381 A1 | 4/2014 | Mork et al. |

FOREIGN PATENT DOCUMENTS

| | | | |
|---|---|---|---|
| EP | 1163989 A1 | 12/2001 | |
| JP | 07-009531 A | * 1/1995 | ............ B29C 47/08 |

* cited by examiner

COMPOSITIONS AND METHODS FOR REMOVING CONTAMINANTS FROM PLASTICS PROCESSING EQUIPMENT

CROSS-REFERENCE

This application claims the benefit of U.S. Provisional Patent Application No. 62/675,438, filed May 23, 2018, and the entire contents of U.S. Provisional Patent Application No. 62/675,438 is hereby incorporated by reference.

TECHNICAL FIELD

The embodiments disclosed herein relate to compositions and methods for removing contaminants, and, in particular to compositions and methods for removing contaminants from plastics processing equipment.

BACKGROUND

Polymer processing, particularly polymers that are polar and/or have an affinity to metal surfaces when melted, can lead to polymer build-up in the polymer processing equipment. For example, polymer build-up is common on a screw or in a barrel of an extruder. Over time, polymer build-up may cause polymers being processed to be overexposed to heat inside of the processing equipment, leading to changes in color or flow characteristics of the polymer. The result of this can be uneven colour and physical characteristics of downstream plastics produced using the polymer processed through the defective equipment.

Various methods are known for purging polymer processing equipment after running a processing resin (i.e. a polymeric composition having one or more polymers. For instance, purging compounds are commercially available and are routinely employed to remove certain processing resins. Purging compounds also find utility when transitioning between processing of a first processing resin to a second processing resin.

Notwithstanding recent advances in purging compounds, current purging compounds tend to have limited effectiveness over a broad range of polymers, resulting in a number of different purge compounds being needed for an individual piece of polymer processing equipment.

Additionally, current purging compounds are inefficient at removing contaminants from polymer processing equipment and require a great deal of unproductive down time of the processing equipment during purging.

Accordingly, there is a need for new or improved compositions and methods for removing of contaminants from plastics processing equipment.

SUMMARY

According to a broad aspect, a purging composition for removing contaminants from plastics processing equipment is described herein. The purging composition includes greater than about 50 weight percent of a polymeric carrier component based on the total weight percent of the purging composition; and greater than about 5 weight percent of an oxidizing agent based on the total weight percent of the purging composition. The oxidizing agent includes a universal polymer, anhydrous sodium persulfate and anhydrous sodium tetraborate. The purging composition is a feedstock material in the form of a plurality of pellets, granules, rods, powder or other particles.

According to another broad aspect, another purging composition for removing contaminants from plastics processing equipment is described herein. The purging composition includes greater than 50 weight percent of a polymeric carrier resin based on the total weight percent of the purging composition; greater than 15 weight percent of an abrasive based on the total weight percent of the purging composition, the abrasive comprising a universal polymer, an abrasive material and antioxidants; and greater than 3 weight percent of a gas agent based on the total weight percent of the purging composition, the gas agent comprising an a universal polymer, anhydrous citric acid and anhydrous soda ash. The purging composition is a feedstock material in the form of a plurality of pellets, granules, rods, powder or other particles.

According to another broad aspect, another purging composition for removing contaminants from plastics processing equipment is described herein. The purging composition includes greater than 50 weight percent of a polymeric carrier resin based on the total weight percent of the purging composition; greater than 15 weight percent of an abrasive based on the total weight percent of the purging composition, the abrasive comprising a universal polymer, an abrasive material and antioxidants; and greater than 3 weight percent of a gas agent based on the total weight percent of the purging composition. The purging composition is a feedstock material in the form of a plurality of pellets, granules, rods, powder or other particles.

According to another broad aspect, another purging composition for removing contaminants from plastics processing equipment is described herein. The purging composition includes greater than 1 weight percent of a polymeric carrier resin based on the total weight percent of the purging composition and greater than 1 weight percent of an abrasive based on the total weight percent of the purging composition. The purging composition is a feedstock material in the form of a plurality of pellets, granules, rods, powder or other particles.

According to another broad aspect, a process for preparing a purging composition described herein is described herein. The process includes mixing at least one of an oxidizing agent, abrasive and gas agent with a polymeric carrier component at a mixing temperature below a predetermined maximum mixing temperature, wherein the at least one of the oxidizing agent, abrasive and gas agent is generally stable at the maximum mixing temperature.

According to a broad aspect, a process for removing contaminants from plastics processing equipment is described herein. The process includes extruding a purging composition described herein at a predetermined processing temperature.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1A:
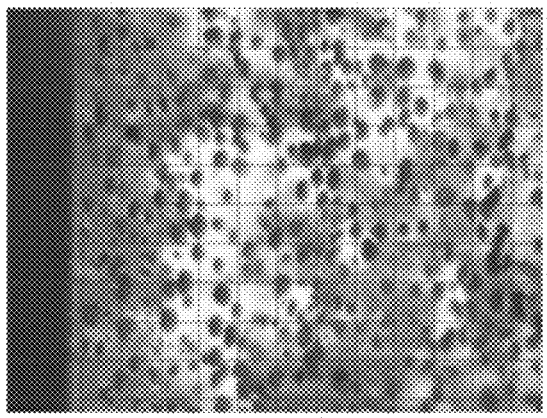
FIGS. 1A to 1D show photos of gas bubble distribution in four samples of purging compositions taken after the purging compositions were extruded from a screw extruder.
Figure 1B:
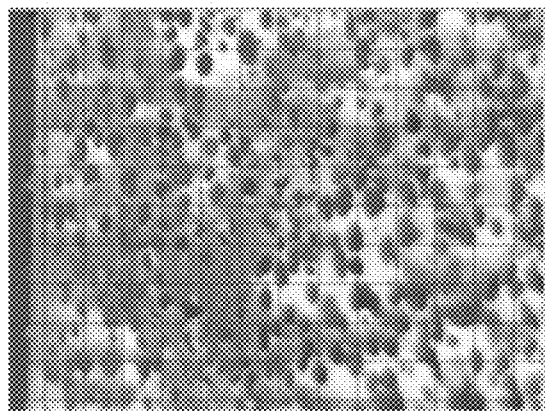
Figure 1C:
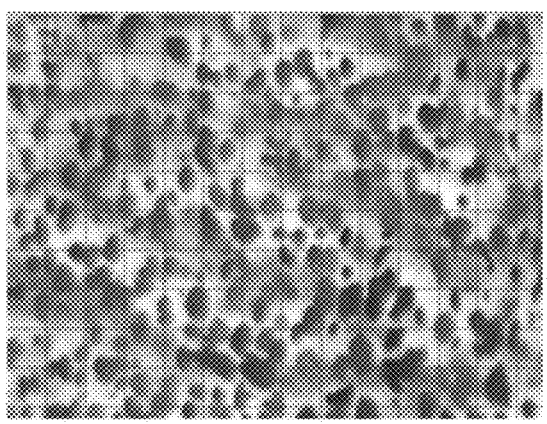

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the FIGS. have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Furthermore, it is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

In spite of the technologies that have been developed, there remains a need in the field for improvements in the development of purging compounds for removing contaminants from plastics processing equipment.

Generally, the purging compositions described herein include a polymeric carrier component and an oxidizing agent. In some embodiments, the purging compositions described herein include a polymeric carrier component and an abrasive. In other embodiments, the purging compositions described herein include a polymeric carrier component, an oxidizing agent and a chemical gas agent. In other embodiments, the purging compositions described herein include a polymeric carrier component, an abrasive and a chemical gas agent. In other embodiments, the purging compositions described herein include a polymeric carrier component, an oxidizing agent, an abrasive and a chemical gas agent.

Polymeric Carrier Component

The purging compositions for removing contaminants from plastics processing equipment comprise a polymeric carrier component and one or more master batched additives.

The polymeric carrier component provides a polymer matrix in which one or more the other components of the purging composition is dispersed. For example, the purging composition may include particles (e.g., pellets, granules, rods, powders, or other particles) each containing a mixture of the polymeric carrier component, the batched oxidizing agent, the batched abrasives the batched chemical gas agent.

In some embodiments, polymeric carrier resins represent the majority of the polymer compositions described herein. The polymeric carrier supports the master batched additives, described further below, and delivers the master batched additives to the areas of the polymer processing equipment where the master batches will have the maximum effectiveness. When finished, the polymeric carrier components carry the contamination and/or residue from the plastics processing equipment.

The polymeric carrier component may include, consist substantially of, or consist entirely of one or more polymers. In some embodiments, the polymeric carrier component maybe chemically inert to oxidation when used in conjunction with master batched oxidizing agents, described further below, and in general terms may be of higher intrinsic viscosity than that of the polymeric material that is being removed from the polymer processing equipment.

Without limitation, suitable polymers for use in the polymeric carrier component include olefin containing polymers and styrene containing polymers.

For example, the polymeric carrier component may include, consist essentially of, or consist entirely of one or more polyolefin polymers, such as one or more polyolefin homopolymers (e.g. polyethylene homopolymers, polypropylene homopolymers, or both) or one or more copolymers including at least 50 weight percent of a first α-olefin (e.g. ethylene or propylene) based on the total weight of the polyolefin polymer.

In some embodiments, the polymeric carrier component includes one or more thermoplastics, such as a high molecular weight polyethylene resin (HDPE). In some embodiments, the polymeric carrier component may have a melt flow rate (MFR) (ASTM D1238 at 190° C. and 5 kg weight) greater than 0.1 grams in 10 minutes and specific gravity less than 0.965. In some embodiments, the polymeric carrier component has a MFR in a range of about 1.0 to 5.0 g/10 minutes and a specific gravity in a range of about 0.948 to 0.960.

In the compositions for removing contaminants from plastics processing equipment described herein, the content of the polymeric carrier resin can be in a range of about 10 to 90 weight percent, and particularly in a range of about 50 to 90 weight percent, and more particularly in a range of about 70 to 90 weight percent of the total composition.

Universal Master Batch Polymer

Each of the master batched additives included in the purging compositions for removing contaminants from plastics processing equipment described herein include one or more universal master batch polymers.

Universal master batch polymers are generally compatible in both polar and non-polar matrixes of plastic. As such, universal master batch polymers are generally ideal for carrying ingredients such as but not limited to the other components of each of the master batched additives, described below, into dissimilar plastics.

Ideally, the master batched additives (or ingredients) should achieve uniform distribution and dispersion within the purging compositions described here. In some embodiments, the inclusion of a universal master batch polymer as a component of the master batched additives described below may improve mixing of the master batched additives throughout the purging composition and/or throughout the polymer processing equipment by improving the flow dynamics of the master batched additives. For instance, the use of universal master batch polymers with lower viscosities than the polymeric carrier component as carriers in the master batch additives may increase fluid turbulence (e.g. through increasing Reynolds number) of the purging composition and aid in achieving optimal distribution and dispersion of the other components (or ingredients) of the master batched additives within the purging composition generally.

For example the universal master batch polymers may include, consist essentially of, or consist entirely of one or more polyethylene copolymers with a second monomer including at least one methylacrylates, butylacrylates, ethylacrylates, and acrylates, polyethylene waxes (either regular or chemically modified), hydro carbon resins, elastomeric resins, low molecular weight polymers. Further, without limited the foregoing, the master batch polymers may include, consist essentially of, or consist entirely of polyethylene waxes (regular & chemically modified—oxidized or grafted), hydro carbon resins, elastomeric resins, low molecular weight polymers, olefinic plastomers and the like.

In some embodiments, the universal master batch polymers may have a melt index (190° C./2.16 kg) in a range of about 1 to 25, and more specifically in a range of about 1.0 to 4.0. In some embodiments, the universal master batch polymers may have a melt temperature in a range of about 50 to 100° C., more specifically in a range of about 60 to 65° C.

When incorporated into the oxidizing agent described below, the universal master batch polymer may be an ethylene-propylene copolymer agent. In some embodiments, when incorporated into the oxidizing agent, the content of the universal master batch polymers can be in a range of about 25 to 90 weight percent, and particularly in a range of about 29 to 35 weight percent of the oxidizing agent.

When incorporated into the abrasives described below, the universal master batch polymer may be an ethylene-methyl acrylate copolymer. In some embodiments, when incorporated into the abrasives described below, the content of the universal master batch polymers can be in a range of about 45 to 95 weight percent, and more particularly in a range of about 75 to 95 weight percent of the abrasive.

When incorporated into the chemical gas agent described below, the universal master batch polymer may be an ethylene-methyl acrylate. In some embodiments, when incorporated into the chemical gas agent described below, the content of the universal master batch polymers can be in a range of about 10 to 90 weight percent, and more particularly in a range of about 28 to 35 weight percent of the chemical gas agent.

Master Batched Oxidizing Agent

The purging compositions for removing contaminants from plastics processing equipment may comprise a master batched oxidizing agent as a master batch additive. In some examples, the master batched oxidizing agent may increase the flow of the purging composition in the polymer processing equipment. In some examples, the master batched oxidizing agent may increase the Reynolds number of purging compositions. In some examples, the master batched oxidizing agent may increase turbulent flow of the purging composition within the polymer processing equipment. In some examples, the master batched oxidizing agent may oxidatively reduce the polymer (e.g. polymer residue and/or contaminant) within the polymer processing equipment. This oxidative reduction of the polymer residue may reduce the molecular weight of the polymer residue, increase the rate of viscosity reduction of the polymer residue, or both.

The master batched oxidizing agent may include, consist substantially of, or consist entirely of one or more universal master batch polymer as described above, anhydrous sodium persulfate, anhydrous sodium tetraborate and other process additives.

In some embodiments the one or more universal master batch polymer may include an ethylene-propylene copolymer. In some embodiments, the oxidizing agent may include transitional metal fatty acid carboxylates that are catalysts which have been identified to oxidize polymers.

In the master batched oxidizing agent, the universal master batch polymer may be an ethylene-propylene copolymer agent in a range of about 25 to 90 weight percent, and particularly in a range of about 70 to 90 weight percent of the master batched oxidizing agent.

In the oxidizing agent, the content of the anhydrous sodium persulfate can be in a range of about 10 to 45 weight percent, and particularly in a range of about 29 to 35 weight percent of the master batched oxidizing agent.

In the oxidizing agent, the content of the anhydrous sodium tetraborate can be in a range of about 2 to 45 weight percent, and particularly in a range of about 29 to 35 weight percent of the master batched oxidizing agent.

In the oxidizing agent, the content of the other process additives can be in a range of about 0 to 5 weight percent, and particularly in a range of about 0.5 to 2 weight percent of the master batched oxidizing agent.

In the purging compositions for removing contaminants from plastics processing equipment described herein, the content of the oxidizing agent can be in a range of about 0 to 50 weight percent, and particularly in a range of about 0 to 17 weight percent of the total composition. When the content of the m master batched oxidizing agent is within the aforementioned ranges, the obtained compositions generally have a melt temperature in a range of about 50 to 100° C., and particularly in a range of about 60 to 65° C., and generally have a melt index (190° C./2.16 kg) in a range of about 1 to 25, and particularly in a range of about 1 to 4.

Master Batched Abrasives

The purging compositions for removing contaminants from plastics processing equipment may comprise a master batched abrasive as a master batch additive. In some examples, the master batched abrasive can include a universal master batched polymer, an abrasive material and other process additives. The master batched abrasive may also include antioxidants.

The master batched abrasive may include or consist essentially of one or more universal master batch polymers as described above. For instance, the master batched abrasive may include or consist essentially of one or any combination of the following components as the universal master batch polymer: an ethylene-methyl acrylate copolymer, sodium-potassium-aluminum silicates and antioxidants.

In the master batched abrasives described herein, the abrasive material may include minerals that are mined or synthesized and ground (e.g. as an untreated or a treated powder). For instance, the minerals may be treated with a compatibilization agent for plastics such as but not limited to stearate, a fatty acid, siloxane or other materials which provide the abrasive to be miscible in the polymer matrix.

The abrasive material may originate, but is not limited to originating from, the following families of materials: aluminum silicates, sodium-potassium-aluminum silicates, calcium metasilicates, calcium carbonates, titanium dioxide, aluminum oxide, mica, kaolin, perlite, fiberglass, and any mixture of two or more thereof. In some embodiments, the abrasive material may be a sodium-potassium-aluminum silicate.

In some embodiments, the abrasive material may be processed to have a particle size no larger than 0.030" (e.g. by filtering), more specifically no larger than 0.006". In some embodiments, as the particle size of the abrasive material decrease, the abrasive can be extruded through the hot runners of an injection mold's manifold.

The abrasive material has a hardness that is ideally hard enough to scrub and/or remove the contamination (e.g. polymeric contamination) from the plastic processing equipment, but not hard enough to damage the plastic processing equipment. In some embodiments, the abrasive material may include three-dimensional irregular particles, which may have sharp edges such that as they will tumble in turbulent flow and scrap the inner surfaces of the plastic processing equipment (e.g. an extruder screw and barrel) free of contamination.

In some embodiments, the abrasive material has a Mohr hardness in a range of about 2 to 9 mohr, more particularly in a range of about 3 to 6 mohr.

In the master batched abrasive, the content of the abrasive material can be in a range of about 1 to 50 weight percent, and particularly in a range of about 5 to 45 weight percent, and more particularly in a range of about 25 to 33 weight percent of the master batched abrasive.

In the master batched abrasive, the content of the antioxidants can be in a range of about 0 to 1 weight percent, and particularly in a range of about 0.05 to 0.08 weight percent of the master batched abrasive.

In the master batched abrasive, the content of the other process additives can be in a range of about 0 to 3 weight percent, and particularly in a range of about 0.25 to 1 weight percent of the master batched abrasive.

In the purging compositions for removing contaminants from plastics processing equipment described herein, the content of the master batched abrasive can be in a range of about 0 to 50 weight percent, and particularly in a range of about 0 to 25 weight percent, of the total composition. When the content of the m master batched abrasive is within the aforementioned ranges, the obtained compositions generally have a melt temperature in a range of about 50 to 100° C., and particularly in a range of about 60 to 65° C., and generally have a melt index (190° C./2.16 kg) in a range of about 1 to 25, and particularly in a range of about 1 to 4.

Master Batched Gas Agent

The purging compositions for removing contaminants from plastics processing equipment may comprise one or more gas agents (e.g. foaming agents). One or more physical gas agents or chemical gas agents that are heat sensitive and undergo a decomposition reaction upon heating to produce gas can be used in the purging compositions described herein. In each case, the physical gas agent(s) or chemical gas agent(s) may be mixed with a universal master batch polymer (as described above) and other process additives to form the master batched gas agent.

Physical gas agents that can be included in the master batched gas agents described herein include but are not limited to compression gases such as nitrogen, carbon dioxide and light hydrocarbons, and water.

Chemical gas agents that can be included in the master batched gas agents described herein may include but are not limited to chemical gas agents originating from the following families of materials: $CO_2$ generating materials such as inorganic carbonates and bicarbonates and a polycarbonic acid, nitrogen generating materials such as azodicarbonamide/diisopropylhydrazodicarboxylate and other hydrazine materials, and metal hydrates.

Chemical gas agents may provide for gas solvation of the polymer residue. Chemical gas agents may be selected based on the potential of the chemical gas agent to offers the miscibility into the polymer residue boundary layer.

In some examples, the master batched gas agent forms gas bubbles in the purging composition. In some examples, the chemical gas agent is uniformly distributed as gas bubbles. In some examples, the gas bubbles have a diameter of about 25 μm (i.e. 0.001").

Figure 1D:
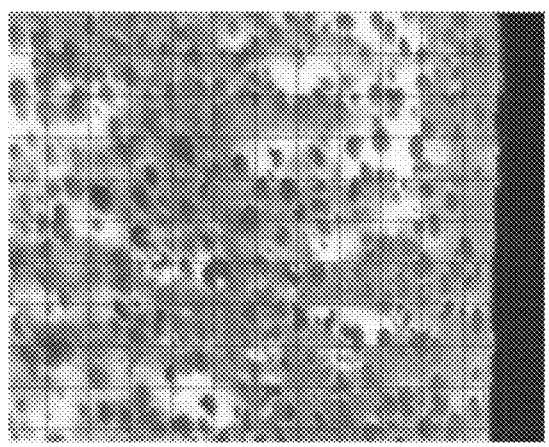

Referring now to FIGS. 1A to 1D, illustrated therein are four photos showing gas bubble distributions in four purging composition samples taken after the purging composition was extruded from a polymer extruder. In FIGS. 1A and 1D, the dark edge on the left side of FIG. 1A and on the right side of FIG. 1D this represents an outer edge of the extrudate. This outer edge mimics the interface that exists in the die wall of the polymer processing equipment where, generally, the lowest polymer flow is observed. FIGS. 1A to 1D show consistent gas bubble distribution of the chemical gas agent throughout each of the samples.

FIGS. 1A to 1D illustrate the ability of universal master batch polymer (such as EMA/MMA) to enhance the desired characteristics by carrying the abrasive/chemical gas agent/oxidizer into contamination (e.g. polymer residue) within polymer processing equipment. Thereby allowing for the effective removal thereof.

The choice of universal master batch polymer may provide for penetration into the polymer residue. Once the universal master batch polymer penetrates the polymer residue, each of the master batched abrasive, master batched gas agent and master batched oxidizing agent may contribute to increasing the Reynolds number of the polymer reside to melt the polymer residue, thereby generating and/or increasing turbulent flow within the polymer processing equipment. With increased turbulent flow, the scrubbing effective of the abrasive material can be enhanced and dispersive and distributive mixing of the gas bubbles may occur to uniformly distribute the gas bubbles throughout the polymer matrix.

In the extrudate of the FIGS, the continual phase may be a polar polymer (e.g. polystyrene).

The master batched gas agent may include or consist essentially of one or more universal master batch polymers as described above. For instance, the gas agent may include or consist essentially of one or any combination of the following components: a universal polymer and $CO_2$ generating materials such as inorganic carbonates and bicarbonates and a polycarbonic acid, nitrogen generating materials such as azodicarbonamide/diisopropylhydrazodicarboxylate and other hydrazine materials, and metal hydrates.

In some embodiments, the master batched gas agent may include anhydrous citric acid and/or anhydrous soda as chemical gas agents.

In the master batched gas agent, the content of universal master batched polymer can be in a range of about 10 to 90 weight percent, and particularly in a range of about 28 to 35 weight percent of the master batched gas agent.

In the master batched gas agent, the content of the anhydrous citric acid can be in a range of about 5 to 45 weight percent, and particularly in a range of about 28 to 35 weight percent of the master batched gas agent.

In the master batched gas agent, the content of the anhydrous soda ash can be in a range of about 5 to 45 weight percent, and particularly in a range of about 28 to 35 weight percent of the master batched gas agent.

In the master batched gas agent, the content of the other process additives can be in a range of about 0.1 to 3 weight percent, and particularly in a range of about 0.5 to 1.5 weight percent of the master batched gas agent.

In the purging compositions for removing contaminants from plastics processing equipment described herein, the content of the master batched gas agent can be in a range of about 1 to 10 weight percent, and particularly in a range of 0 to 6 weight percent of the total composition. When the content of the master batched gas agent is within the aforementioned ranges, the obtained compositions generally have a melt temperature in a range of about 50 to 100° C., and particularly in a range of about 60 to 65° C., and generally have a melt index (190° C./2.16 kg) in a range of about 1 to 25, and particularly in a range of about 1 to 4.

Optional Additional Ingredients

The purging compositions according to the teachings herein may further include one or more fillers and/or other art known additives, such as heat stabilizers, processing aids, antiblocking agents, antistatic agents, coupling agents, antioxidants, lubricants, pigments, foaming agents, surfactants, plasticizers and the like, each in an amount which will not adversely affect the effects of the purging composition.

For example, the purging composition according to the teachings herein may further include one or more additional additives that are known in the art to promote the purging of polymer processing equipment (including but not limited to foaming agents, surfactants, plasticizers, or any combination thereof). In some examples, the purging composition includes one, two or three additives selected from the group consisting of foaming agents, surfactants and plasticizers.

Processes

In some embodiments, a process for preparing a purging composition for removing contaminants from plastics processing equipment is also described herein. The process includes mixing an oxidizing agent with a polymeric carrier component at a mixing temperature below a predetermined maximum mixing temperature, wherein the oxidizing agent is generally stable at the maximum mixing temperature.

In some embodiments, the process for preparing the purging composition for removing contaminants from plastics processing equipment may include mixing the oxidizing agent, the abrasive and the chemical gas agent with the polymeric carrier component at a mixing temperature below a predetermined maximum mixing temperature, wherein the oxidizing agent, the abrasive and the chemical gas agent are generally stable at the maximum mixing temperature.

In some embodiments, the process for preparing the purging composition for removing contaminants from plastics processing equipment may include mixing the abrasive and the chemical gas agent with the polymeric carrier component at a mixing temperature below a predetermined maximum mixing temperature, wherein the abrasive and the chemical gas agent are generally stable at the maximum mixing temperature.

In some embodiments, the mixing may include hand mixing or tumble mixing.

In some embodiments, a process for removing contaminants from plastics processing equipment is described herein, the process comprising extruding a composition described herein at a predetermined processing temperature.

EXAMPLES

Herein three experiments are described below, as outlined in Table 1, demonstrating the effectiveness of purging compositions described herein. All of the materials listed below are available in a powder form and as master batched pellets.

TABLE 1

Components of purging compositions used in Experiments 1 to 3

| Material | Experiment 1 | Experiment 2 | Experiment 3 |
|---|---|---|---|
| HDPE Carrier resin | 86% | 76% | 75% |
| Master batched oxidizing agent | 14% | 14% | |
| Master Batched Abrasives | | 5% | 20% |
| Master Batched chemical gas agents | | 5% | 5% |
| Form | Blend of pellets | Blend of pellets | Blend of pellets |

The compositions of the master batched oxidizing agent, the master batched abrasives and the master batched chemical gas agents of Table 1, above, are provided in Tables 2 to 4, below.

TABLE 2

Composition of Master Batched Oxidizing Agent of Table 1.

| Material | Percentage | Comments |
| --- | --- | --- |
| Ethylene/Propylene Copolymer | 34% | Universal carrier |
| Anhydrous Sodium Persulfate | 33% | 100% through 325 mesh |
| Anhydrous Sodium Tetraborate | 32% | 100% through 325 mesh |
| Process adds | 1% | |
| Form | | pellets |

TABLE 3

Composition of Master Batched Abrasive of Table 1.

| Material | Percentage | Comments |
| --- | --- | --- |
| Ethylene/methyl acrylate copolymer | 75.95% | Universal carrier |
| Sodium-potassium-aluminum silicates | 33% | 100% through 325 mesh |
| Antioxidants | 0.05% | 100% through 325 mesh |
| Process adds | 1% | |
| Form | | pellets |

TABLE 4

Composition of Master Batched Chemical Gas Agent of Table 1.

| Material | Percentage | Comments |
| --- | --- | --- |
| Ethylene/methyl acrylate copolymer | 33% | Universal carrier |
| Anhydrous citric acid | 33% | 100% through 325 mesh |
| Anhydrous soda ash | 32% | 100% through 325 mesh |
| Process oil (white mineral oil) | 1% | |
| Form | | Pellets |

Experiment 1

Experiment 1 was conducted with the following equipment and under the following parameters:
Equipment:
Brabender Plasti-Corder® and measuring extruder basic program with multiple evaluation version 4.1.3\
Extruder type: Single ¾" screw—30:1 L/D
Extruder cooling: Air
Feed section: Aval
Hopper/dosing: Hopper 300 ml
Drive type: Intelli Torque 7150
Screw: Standard single
Die Type: Rod die
Software: Winext multiple evaluation version 4.1.3
Parameters:
RPM: 45
Heat zone 1: 271.1° C.
Heat zone 2: 282.2° C.
Heat Zone 3: 282.2° C.
Heat Zone 4: 293.3° C.
Material Evaluated: Polycarbonate A purging solution according to the composition provided in Table 1 above was employed between each material to facilitate quick colour change out from red polycarbonate to clear polycarbonate to amber polycarbonate to clear polycarbonate. At the end of both of the red polycarbonate and amber polycarbonate samples, a barrel full of material was left inside in the extruder under fill heat for 10-15 minutes each. The objective was to bake/burn the polymer in the equipment. Smoke and black polymer was noted leaving the end of the rod die.

Extruder Residence time under these conditions was determined and the total free volume was calculated.

350 grams of polymer were loaded in the hopper each time 168 grams the purging composition was added at each transition. Equivalent to 1.5 time the free volume of the extruder.

Effectively, the screw and barrel were clean and able to advance from one polymer to the next polymer with no carrier over of pigment, contamination or burnt polymer. Each transition was facilitated within 5 minutes.

Experiment 2

Experiment 2 was conducted with the following equipment and under the following parameters:
Equipment:
Brabender Plasti-Corder® and measuring extruder basic program with multiple evaluation version 4.1.3
Extruder type: Single ¾" screw—30:1 L/D
Extruder cooling: Air
Feed section: Aval
Hopper/dosing: Hopper 300 ml
Drive type: Intelli Torque 7150
Screw: Standard single
Die Type: Rod die
Software: Winext multiple evaluation version 4.1.3
Parameters:

| Material | Start: LLDPE | Purge | PMMA | Polycarbonate | Finish: LLDPE |
| --- | --- | --- | --- | --- | --- |
| RPM: | 40 | 30 | 30 | 50 | 40 |
| Heat zone 1: | 356° F. | 379.9° F. | 424.9° F. | 519.9° F. | 356° F. |
| Heat zone 2: | 356° F. | 390.0° F. | 435.0° F. | 539.9° F. | 356° F. |
| Heat zone 3: | 374° F. | 399.9° F. | 449.9° F. | 539.9° F. | 374° F. |
| Heat zone 4: | 383° F. | 410° F. | 435.0° F. | 559.9° F. | 383° F. |

Material Evaluated: Automotive Headlight Polymers
Red PMMA—Arkema V826-461
Clear PMMA—Arkema Plexiglass V825-100 clear
Clear PC—Sabic Lean LS1-111 clear PC
Red PC—Mitsubishi PC ML300 Red
Amber PC—Sabic LS2-4158 Amber PC The purging composition was employed between each material to facilitate quick colour change out from Red PMMA to Clear PMMA to Clear PC to Red PC to Amber PC to Clear PC. At the end of Red PMMA, Clear PMMA, Red PC and Amber PC samples, a barrel full of material was left inside in the extruder under fill heat for 20-30 minutes each. The objective was to bake/burn the polymer in the equipment. Smoke and black polymer was noted leaving the die.

Extruder Residence time under these conditions was determined and the total free volume calculated.

350 grams of polymer were loaded in the hopper each time 168 grams of purging composition (e.g. Fresh Start GP Hybrid) was added at each transition. Equivalent to 1.5 time the free volume of the extruder.

Effectively, the screw and barrel were clean and able to advance from one polymer to the next polymer with no carrier over of pigment, contamination or burnt polymer. Each transition was facilitated within 5 minutes.

Experiment 3

Experiment 3 was conducted with the following equipment and under the following parameters:
Equipment:
Brabender Plasti-Corder® and measuring extruder basic program with multiple evaluation version 4.1.3

Extruder type: Single ¾" screw—30:1 L/D
Extruder cooling: Air
Feed section: Aval
Hopper/dosing: Hopper 300 ml
Drive type: Intelli Torque 7150
Screw: Standard single
Die Type: Rod die
Software: Winext multiple evaluation version 4.1.3
Parameters:
RPM: 45
Extruder temperatures:

| Heat zone 1: | 395° F. |
|---|---|
| Heat zone 2: | 410° F. |
| Heat zone 3: | 428° F. |
| Heat zone 4: | 435° F. |

Material Evaluated: Polypropylene Copolymer

The purging composition was employed between each material to facilitate quick colour change out from black polypropylene copolymer to white polypropylene copolymer.

Extruder Residence time under these conditions was determined and the total free volume calculated.
- 350 grams of polymer were loaded in the hopper each time
- 158 grams of purging composition (e.g. Fresh Start MC2) was added at each transition. Equivalent to 1.5 times the free volume of the extruder.

Effectively, the screw and barrel were clean and able to advance from one polymer to the next polymer with no carrier over of pigment, contamination or burnt polymer within 3.5 minutes.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A purging composition for removing contaminants from plastics processing equipment, the purging composition comprising:
   greater than about 50 weight percent of a polymeric carrier component based on the total weight percent of the purging composition; and
   greater than about 5 weight percent of an oxidizing agent based on the total weight percent of the purging composition, the oxidizing agent comprising a universal polymer, anhydrous sodium persulfate and anhydrous sodium tetraborate;
   wherein the purging composition is a feedstock material in the form of a plurality of pellets, granules, rods, powder or other particles.

2. The purging composition of claim 1, wherein the oxidizing agent comprises:
   greater than about 30 weight percent of a universal polymer based on the total weight percent of oxidizing agent;
   greater than about 30 weight percent anhydrous sodium persulfate based on the total weight percent of the oxidizing agent; and
   greater than about 30 weight percent anhydrous sodium tetraborate based on the total weight percent of the oxidizing agent.

3. The purging composition of claim 1, wherein the polymeric carrier component may include, consist essentially of, or consist entirely of one or more polyolefin polymers, the one or more polyolefin polymers including one or more polyolefin homopolymers.

4. The purging composition of claim 1, wherein the polymeric carrier component is chemically inert to oxidation.

5. The purging composition of claim 1, wherein the polymeric carrier component is a high density polyethylene carrier resin.

6. The purging composition of claim 1, wherein the polymeric carrier component has a melt flow rate greater than about 0.1 grams per 10 minutes.

7. The purging composition of claim 1, wherein the polymeric carrier component has a specific gravity less than about 0.965.

8. The purging composition of claim 1, wherein the universal polymer comprises, consists essentially of, or consists entirely of one or more polyethylene copolymers with a second monomer including at least one of methylacrylates, butylacrylates, ethylacrylates, and acrylates, polyethylene waxes (either regular or chemically modified), hydrocarbon resins, elastomeric resins, and olefinic plastomers.

9. The purging composition of claim 1, wherein the universal polymer is an ethylene-propylene copolymer.

10. The purging composition of claim 1, wherein the polymeric carrier component is between 80 and 90 weight percent of the total weight percent of the purging composition and the oxidizing agent is about 10 to 20 weight percent of the total weight percent of the purging composition.

11. The purging composition of claim 1, further comprising:
   greater than about 3 weight percent of an abrasive based on the total weight percent of the purging composition, the abrasive comprising a universal polymer, an abrasive material and an antioxidant; and
   greater than about 3 weight percent of a gas agent based on the total weight percent of the purging composition.

12. The purging composition of claim 11, wherein the abrasive material is selected from a group consisting of: aluminum silicates, sodium-potassium-aluminum silicates, calcium metasilicates, calcium carbonates, titanium dioxide, aluminum oxide, mica, kaolin, perlite, fiberglass, metal oxides and metal hydrates, or is a mixture of two or more thereof.

13. The purging composition of claim 11, wherein the abrasive comprises:
   greater than about 45 weight percent of the universal polymer;
   greater than about 5 weight percent of the abrasive material; and
   greater than about 0.01 weight percent of the antioxidant.

14. The purging composition of claim 11, wherein the gas agent comprises a universal polymer, a $CO_2$ generating material or a nitrogen generating material, or a combination thereof.

15. The purging composition of claim 14, wherein the gas agent comprises a universal polymer, anhydrous citric acid and anhydrous soda ash.

16. The purging composition of claim 11, wherein the abrasive is about 5 weight percent of the total weight percent of the purging composition and the gas agent is about 5 weight percent of the total weight percent of the purging composition.

17. A purging composition for removing contaminants from plastics processing equipment, the composition comprising:
   a) greater than 50 weight percent of a polymeric carrier component based on the total weight percent of the purging composition;
   b) greater than 15 weight percent of an abrasive based on the total weight percent of the purging composition, the abrasive comprising a universal polymer, an abrasive material and an antioxidant, the abrasive material comprising aluminum silicates; and
   c) greater than 3 weight percent of a gas agent based on the total weight percent of the purging composition;
   wherein the purging composition is a feedstock material in the form of a plurality of pellets, granules, rods, powder or other particles.

18. A purging composition for removing contaminants from plastics processing equipment, the composition comprising:
   a) greater than 1 weight percent of a polymeric carrier component based on the total weight percent of the purging composition; and
   b) greater than 1 weight percent of an abrasive based on the total weight percent of the purging composition, the abrasive comprising a universal polymer, an abrasive material and an antioxidant, the abrasive material comprising aluminum silicates;
   wherein the purging composition is a feedstock material in the form of a plurality of pellets, granules, rods, powder or other particles.

19. A process for preparing the purging composition for removing contaminants from plastics processing equipment of claim 1, the process comprising:
   mixing the oxidizing agent with the polymeric carrier component at a mixing temperature below a predetermined maximum mixing temperature, wherein the oxidizing agent is generally stable at the maximum mixing temperature.

20. A process for removing contaminants from plastics processing equipment, the process comprising:
   a) extruding the purging composition of claim 1 at a predetermined processing temperature;
   wherein the purging composition is a feedstock material in the form of a plurality of pellets, granules, rods, powder or other particles.

* * * * *

UNITED STATES PATENT AND TRADEMARK OFFICE
CERTIFICATE OF CORRECTION

PATENT NO. : 11,578,144 B2
APPLICATION NO. : 16/420832
DATED : February 14, 2023
INVENTOR(S) : Joseph Albert Turner and Bryon Wolff Page 1 of 1

It is certified that error appears in the above-identified patent and that said Letters Patent is hereby corrected as shown below:

In the Claims

Claim 3, Column 14, Line 8, "polyolefin homopolymers." should read, -- polyolefin homopolymers and/or one or more polyolefin copolymers. --.

Signed and Sealed this
Twenty-fourth Day of October, 2023

Katherine Kelly Vidal
*Director of the United States Patent and Trademark Office*